FABRICATION OF INTEGRATED OPTICAL CIRCUITS
Filed Aug. 5, 1970
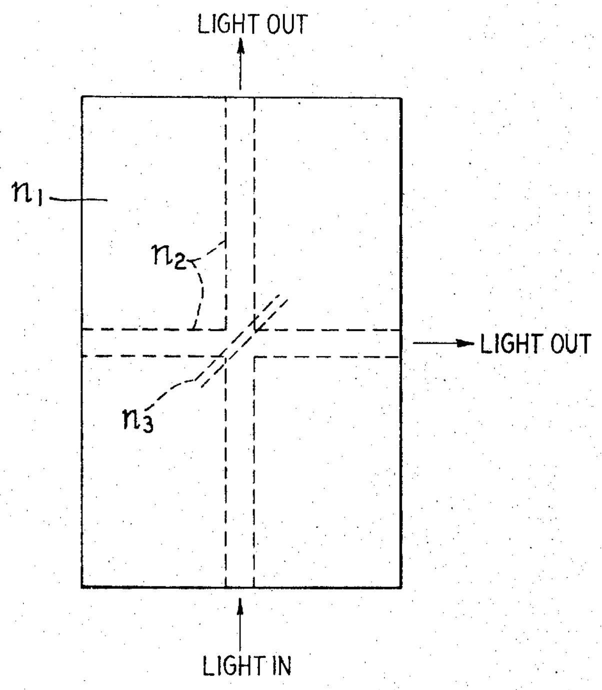
INVENTORS J. D. CUTHBERT
D. H. HENSLER
W. H. ORR
BY George S. Indig
ATTORNEY 3,730,720

FABRICATION OF INTEGRATED OPTICAL CIRCUITS

John David Cuthbert, Bethlehem, Pa., Donald Henry Hensler, Morris, N.J., and William Harold Orr, Carmel, Ind., assignors to Bell Telephone Laboratories, Incorporated, Murray Hill and Berkeley Heights, N.J.

Filed Aug. 5, 1970, Ser. No. 61,067
Int. Cl. G03c *5/00*
U.S. Cl. 96—38.3 10 Claims

ABSTRACT OF THE DISCLOSURE

In this disclosure a process is described for the fabrication of optical integrated circuits. The process consists of forming a film of a metal or alloy on a substrate, removing part of the film by photolithographic techniques so as to form the desired pattern, and then oxidizing this film to the corresponding metal oxide. The metal oxide film on the substrate forms the optical integrated circuit. An advantage of this process is that photolithographic techniques can be used to produce quite complicated patterns of small dimensions.

BACKGROUND OF THE INVENTION

(1) Field of the invention

This invention relates to integrated optical circuits.

(2) Description of the prior art

The development of optical technology in the last few years has emphasized the importance of using small, complex patterns of dielectric material for use in optical circuits. Simple optical circuits have been made using glass sputtering techniques. See, for example, J. E. Goell and R. D. Standley, "Sputtered Glass Waveguide for Integrated Optics Circuits," BSTJ 48, No. 10 (December 1969), pp. 3445–3448. In this technique, glass is RF sputtered onto a suitable substrate. Fused quartz fibers are then used to shadow mask the substrate in the pattern which is desired. The glass film is then back-sputtered, leaving the desired optical circuit under the fused quartz fibers. Because of the difficulty in shaping fused quartz fibers into complex patterns, only relatively simple optical circuits can be made by this method.

SUMMARY OF THE INVENTION

The invention is a process for producing an optical integrated circuit. These circuits are made up of patterns of transparent dielectric film with refractive indexes different from the surrounding media. The magnitudes of the refractive index for film and surrounding media are selected to give the desired optical effects. For example, dielectric films with greater refractive index than the surrounding media have light guiding characteristics. Dielectric films with refractive index less than the surrounding medium are also useful as for example for matching in or out of various parts of an optical circuit.

The inventive process involves first depositing a metal film on a suitable substrate with the intention of oxidizing this metal film to a corresponding oxide to produce the desired transparent dielectric film. However, before metal oxidation, portions of the metal film are removed to produce the desired pattern on the substrate. This is done by standard photolithographic techniques. Oxidation of the metal film to the corresponding metal oxide may be carried out in the variety of ways including air oxidation and anodic oxidation.

BRIEF DESCRIPTION OF THE DRAWING

The figure is a plan view of a light circuit showing a junction type hybrid for coupling light out of one guide into another.

DETAILED DESCRIPTION

This invention involves adapting the present extensive art used in the fabrication of electronic integrated circuits to the fabrication of optical integrated circuits. Many of the techniques used in producing electronic integrated circuits are described in the book, "Thin Film Technology" by R. W. Berry, P. M. Hall, and M. T. Harris (D. Van Nostrand Company, Inc., Princeton, N.J. (1968). The inventive process for the fabrication of optical integrated circuits may be divided into three steps. First, a substrate is coated with a suitable metal or alloy. Second, the desired pattern is produced by photolithographic techniques. Third, the metal coating making up the pattern is oxidized to the corresponding metal oxide. An important aspect of the invention is that the metal and the method of oxidation be chosen so that a glassy or amorphous film is obtained. Films which have extensive crystalline areas would be optically glossy due to scattering at the crystal boundaries. These three steps in the inventive process are described in detail below.

(1) The metal film

The optical integrated circuit is made up of one or more regions with optical properties different from the surrounding area. A typical example is a light waveguide in which a relatively small area of high refractive index is surrounded by material of lower refractive index. Such a pattern when correctly designed for a given wavelength of light retains light within the region of higher refractive index. This reduces the losses due to the spreading of the light beam and may therefore be used to guide light around bends or curves. Other optical functions can be performed by the use of more complex patterns, as for instance described in the article, "Integrated Optics: An Introduction," by S. E. Miller, BSTJ 48 (September 1969), pp. 2059–2069.

The choice of substrate material and metal for the film depends on various factors described below. The substrate material must be mechanically stable and must have suitable optical properties such as low-loss and appropriate index of refraction. Usually, a glass of low refractive index is chosen.

The choice of metal or alloy to be deposited on the substrate is governed largely by the optical properties of the corresponding metal oxide, the ease with which the metal or alloy can be oxidized to a glassy or amorphous metal oxide and the stability of the metal oxide. The optical properties of importance in metal oxide are freedom from optical losses from absorption or excessive scattering and the refracting index at the wavelength of the light to be used. Examples of metals which are suitable for use in this process are tantalum, tungsten, zirconium, aluminum, vanadium, titanium ,niobium, molybdenum and hafnium. Alloys made up of one or more of these metals are also useful.

The method of depositing the metal or alloy film is not critical and depends largely on the methods which are suitable for the particular metal or alloy chosen to be deposited. Deposition of the metal as a crystalline film is not disadvantageous provided oxidation to the metal oxide yields a glassy or amorphous product. Examples of metal deposition processes are vapor deposition, sputtering, electroplating, electroless plating, and chemical vapor plating.

The thickness of the metal or alloy film is determined by the thickness of the metal oxide film desired in the final integrated optical circuit. Naturally, the thickness of the metal film is not necessarily the same as the thickness of the oxide film, but the former determines the latter thickness. Metal films can be made as thin as desired, but there is an upper limit on thickness due to the requirement that the entire metal film be oxidized. This upper limit depends on the metal or alloy. Typical values are 1.5 microns for $\beta$-tantalum and five microns for aluminum.

(2) The photolithographic technique

The desired pattern on the substrate is produced by removing unwanted metal film from the substrate, using photolithographic techniques. This technique is well known in the art and has been described in detail in Chapter 10 of the book entitled, "Thin Film Technology" by R. W. Berry, P. M. Hall, and M. T. Harris (D. Van Nostrand Co., Inc., Princeton, N.J., 1968). This technique involves covering the metal film with a photoresist layer. Two classes of photoresist materials are used, one called a negative resist, and the other called a positive resist. The following description supposes a negative resist material is being used. Here, the portion of the metal film which is to form the pattern is exposed to light through a mask or master pattern. A particular advantage of the present inventive process is that this master pattern may be used to produce a large number of metal film patterns. Those portions of the photoresist layer which are exposed to light become less soluble in certain solvents. Thus, the photoresist which has not been exposed to light can be removed by the use of certain solvents, leaving a pattern of photoresist material over that portion of the metal film which is to remain on the substrate. Then, the unwanted metal film is removed, using commonly known etching materials. The photoresist material which was altered by exposure to light is then removed by the use of stronger organic solvents. The remaining metal film is now in the pattern which is desired.

In positive photoresist techniques, the photoresists become more soluble in certain solvents when exposed to light. Thus, the master pattern or mask must exclude light from the portions of the metal film which are to be retained.

(3) The oxidation of the metal

In order to obtain the desired pattern of dielectric material, the metal film must be oxidized to the corresponding metal oxide. This may be done in a variety of ways, provided a homogeneous film relatively free of scattering centers is obtained. The method of oxidation is chose to yield an amorphous film relatively free of crystalline regions which would scatter light. Two exemplary methods of carrying out this oxidation are given below. One is to heat the metal film deposited on the substrate in an oxygen or air atmosphere until completely converted to the oxide. The temperature of the reaction is not critical except that the temperature must not be so high as to destroy the structure. The temperaure should be sufficiently high so that complete conversion to the oxide takes place in a reasonable time.

Anodic oxidation is also used to convert the metal film to the corresponding metal oxide film. This is an electrolytic process which is carried out in water to which some electrolyte such as citric acid has been added. The metal film is made the anode in this electrolytic process and a sheet of suitable metal is made the cathode. On passing current through this solution, anodic oxidation of the film which comprises the anode takes place.

(4) Examples

Several integrated optical circuits were made according to the inventive processes and various measurements were carried out to evaluate their performance. In one series of experiments the dielectric film was $Ta_2O_5$ and the substrate was Corning 7059 glass. The $Ta_2O_5$ was approximately 3,000 A. thick and about 25 microns wide.

An integrated optical circuit using a $Ta_2O_5$ dielectric film was made as follows: A $\beta$-tantalum film was deposited using a D-C sputtering technique in an argon atmosphere. The $\beta$ form of tantalum has a tetragonal crystal structure and is a stable form at room temperature. The properties of $\beta$-tantalum films and the sputtering conditions under which $\beta$-tantalum films are formed are described in Chapter 4 (page 219) of the above reference on thin film technology. The unwanted tantalum was removed, using a photolithographic technique as described above. The remaining tantalum film was then either air oxidized or anodically oxidized. Both straight sections and curved sections of light waveguide were made.

Several measurements were carried out on both straight and curved sections of $Ta_2O_5$ films made as described above. These measurements included the thickness of the film, the refractive index of the film, and the optical transmission losses in the film.

The thickness of the films was measured mechanically with an instrument designed for this purpose. The dielectric films were found to be approximately 3,000 A. thick. Extensive measurements on both the tantalum metal thickness and $Ta_2O_5$ thickness have shown that one angstrom of metal thickness yielded approximately 2.5 A. of oxide thickness. The results of these experiments were used to predict tantalum oxide thickness from the thickness of the $\beta$-tantalum film.

The index of refraction of the $Ta_2O_5$ film was also measured. Knowledge of the refractive index of the dielectric film is of importance because it determines many of the optical properties of the integrated circuit. Refractive index was measured in two ways. In the first method the characteristics of polarized light reflected off of the $Ta_2O_5$ film were used to deduce the refractive index on the dielectric film. In the second method the characteristic angles at which certain optical modes could be launched into the $Ta_2O_5$ waveguide were determined and from this information, the refractive index of the film was determined.

The refractive index of the $Ta_2O_5$ film was found to be 2.26 at 6,328 A., 2.29 at 5,145 A., and 2.33 at 4,880 A. The index of refraction of the substrate was 1.5 at about 5,000 A.

The attenuation of light per unit length was determined by measuring the scattered light using an optical detector focused on the light streak through a narrow slit system. The detector with its optical slit system is scanned along the dielectric film so that the scattered light intensity is measured as a function of distance. These measurements were carried out using light from a helium-neon laser ($\lambda$=6,328 A.), propagating through a $Ta_2O_5$ film. With this technique, losses due to scattering and absorption are lumped together. The attenuation at 6,328 A. was found to be 2.71 db/cm. At a wavelength of 4,880 A., the attenuation was found to be 3.92 db/cm. Similar $Ta_2O_5$ films were made in the same way as above, except anodic oxidation was used. Here, the attenuation of light per unit length was found to be somewhat greater.

Hafnium oxide was also used as a dielectric material to make similar integrated optical circuits. Procedure was much as described above. The hafnium metal film was put on the substrate by evaporation. The usual photolithographic technique was used to produce the desired metal pattern. The hafnium metal was oxidized to $HfO_2$ thermally by placing the substrate in an oven at about 500 to 600° C. with an oxygen-rich atmosphere. The attenuation of light per unit length in this case was found to be approximately 5 db/cm.

The alloy TaAl was also used to produce a dielectric waveguide. In this case the alloy was sputtered onto a glass substrate, the unwanted alloy removed in the usual way, and the alloy converted to the metal oxide by heating the substrate in an oxygen-rich atmosphere. Measurements of the light attenuation showed that the losses were less than 3 db/cm. in this case.

(5) Drawing

The figure is a plan view of a simple integrated optical circuit called a junction type hybrid. The figure shows a waveguide of the dielectric film where laser light is made to follow the waveguide. The properties of the waveguide depend on the refractive index of the substrate ($n_1$) and dielectric film ($n_2$). Light is coupled out of one guide and into another by means of a groove, with refractive index $n_3$ different from adjacent material. More elaborate structures are discussed in several articles in the September 1969 issue of the Bell System Technical Journal.

What is claimed is:

1. A process for producing an integrated optical circuit consisting of a pattern of optically transparent substance on a substrate which includes means of coupling optical radiation into and out of the integrated optical circuit and in which optical radiation propagates parallel to the surface of the substrate and in which the optically transparent substance consists essentially of meta oxide comprising the steps of (A) depositing a metallic film on the substrate, (B) covering the metallic film with a photoresist layer, (C) exposing the protoresist layer to light through a mask pattern so as to expedite removal of portions of the photoresist, (D) removing the portions of the photoresist as specified in step (C) above thereby leaving portions of bared metal which constitute a negative of the said pattern, (E) removing that portion of the metallic film which becomes exposed by exposing entire surface to etching solution which selectively etches the bared metal, (F) removing the residual photoresist, and (G) completely oxidizing the residual metallic film so revealed by removal of residual photoresist so as to form an amorphous light transparent film consisting essentially of the corresponding metallic oxide.

2. Process of claim 1 in which the metal is selected from the group consisting of tantalum, tungsten, zirconium, aluminum, vanadium, titanium, niobium, hafnium and molybdenum.

3. Process of claim 2 in which $\beta$-tantalum is used as the metal.

4. Process of claim 2 in which hafnium is used as the metal.

5. Process of claim 1 in which the residual metallic film consists essentially of an alloy.

6. Process of claim 5 in which the alloy contains a metal selected from the group consisting of tantalum, tungsten, zirconium, aluminum, vanadium, titanium, niobium hafnium and molybdenum.

7. Process of claim 6 in which the alloy consists essentially of tantalum and aluminum.

8. Process of claim 7 in which the oxidizing is carried out in an electrolyte with the residual metallic film as the anode and electric current is passed through the electrolyte and anode so as to anodically oxidize the metallic film.

9. Process of claim 1 in which the oxidizing is carried out in a gaseous atmosphere which includes oxygen gas so as to convert the residual metallic film to the corresponding oxide.

10. An integrated optical circuit made by the process of claim 1.

References Cited

UNITED STATES PATENTS

| | | | |
|---|---|---|---|
| 3,622,319 | 11/1971 | Sharp | 96—36.2 |
| 3,445,353 | 5/1969 | Harinxma | 204—56 |

NORMAN G. TORCHIN, Primary Examiner

E. C. KIMLIN, Assistant Examiner

U.S. Cl. X.R.

96—36